United States Patent
Kerber et al.

(10) Patent No.: US 12,163,588 B2
(45) Date of Patent: Dec. 10, 2024

(54) SEALING DEVICE WITH INCREASED SURFACE ROUGHNESS

(71) Applicant: SIKA TECHNOLOGY AG, Baar (CH)

(72) Inventors: Carine Kerber, Sarnen (CH); Matthias Gössi, Uster (CH); Herbert Ackermann, Tann (CH)

(73) Assignee: SIKA TECHNOLOGY AG, Baar (CH)

( * ) Notice: Subject to any disclaimer, the term of this patent is extended or adjusted under 35 U.S.C. 154(b) by 306 days.

(21) Appl. No.: 17/774,524

(22) PCT Filed: Dec. 9, 2020

(86) PCT No.: PCT/EP2020/085370
§ 371 (c)(1),
(2) Date: May 5, 2022

(87) PCT Pub. No.: WO2021/122243
PCT Pub. Date: Jun. 24, 2021

(65) Prior Publication Data
US 2022/0396056 A1    Dec. 15, 2022

(30) Foreign Application Priority Data
Dec. 18, 2019    (EP) ..................................... 19217762

(51) Int. Cl.
*F16J 15/10*    (2006.01)
*B32B 5/20*    (2006.01)
*B32B 27/06*    (2006.01)

(52) U.S. Cl.
CPC ............... *F16J 15/102* (2013.01); *B32B 5/20* (2013.01); *B32B 27/065* (2013.01);
(Continued)

(58) Field of Classification Search
CPC ........ F16J 15/102; B32B 5/20; B32B 27/065; B32B 2264/101; B32B 2264/1021;
(Continued)

(56) References Cited

U.S. PATENT DOCUMENTS 11,459,761 B2 * 10/2022 Ackermann ............ B32B 27/08
11,597,684 B2 * 3/2023 Caviezel ................ B32B 27/34
(Continued)

FOREIGN PATENT DOCUMENTS

EP    3418050 A1 * 12/2018 ............... B28B 3/22
WO    2017/108826 A1    6/2017
(Continued)

OTHER PUBLICATIONS

Jan. 27, 2021 International Search Report issued in International Patent Application No. PCT/EP2020/085370.
(Continued)

*Primary Examiner* — Nicholas L Foster
(74) *Attorney, Agent, or Firm* — Oliff PLC

(57) ABSTRACT

A sealing device includes a functional layer having a first major surface and a second major surface and a barrier layer directly or indirectly connected to the second major surface of the functional layer, wherein the functional layer has a surface roughness having a waviness factor $W_f$. Also disclosed is a method for producing a sealing device and the use of a sealing device for waterproofing of a substrate.

16 Claims, 2 Drawing Sheets

(52) U.S. Cl.
CPC . *B32B 2264/1027* (2020.08); *B32B 2264/303* (2020.08); *B32B 2266/0221* (2013.01); *B32B 2581/00* (2013.01)

(58) Field of Classification Search
CPC .... B32B 2264/1026; B32B 2264/1027; B32B 2264/107; B32B 2264/303; B32B 2266/0221; B32B 2266/025; B32B 2266/0257; B32B 2266/0264; B32B 2266/0228; B32B 2266/0235; B32B 2581/00

See application file for complete search history.

(56) References Cited

U.S. PATENT DOCUMENTS

| | | | |
|---|---|---|---|
| 11,945,983 B2 * | 4/2024 | Ackermann | B32B 27/20 |
| 2003/0184017 A1 * | 10/2003 | Moriarty | F16J 9/16 |
| | | | 277/310 |
| 2008/0095973 A1 * | 4/2008 | Abrams | B05D 3/06 |
| | | | 156/72 |
| 2020/0181018 A1 * | 6/2020 | Caviezel | B32B 27/302 |
| 2021/0171808 A1 * | 6/2021 | Ackermann | E04D 5/10 |
| 2021/0172174 A1 * | 6/2021 | Ackermann | B32B 27/28 |
| 2023/0150875 A1 * | 5/2023 | Caviezel | B28B 3/22 |
| | | | 428/323 |
| 2023/0311464 A1 * | 10/2023 | Ackermann | B32B 27/32 |
| | | | 156/71 |

FOREIGN PATENT DOCUMENTS

| | | |
|---|---|---|
| WO | 2017/108843 A1 | 6/2017 |
| WO | 2017/108844 A1 | 6/2017 |
| WO | 2017/108846 A1 | 6/2017 |
| WO | 2018/122113 A1 | 7/2018 |

OTHER PUBLICATIONS

Jan. 27, 2021 Written Opinion issued in International Patent Application No. PCT/EP2020/085370.

* cited by examiner

SEALING DEVICE WITH INCREASED SURFACE ROUGHNESS

TECHNICAL FIELD

The invention relates to sealing devices for use in the construction industry, for waterproofing of below or above ground building constructions. In particular, the invention relates to sealing devices, which can be used for protecting basements, roofing, and tunneling structures against penetration of water.

BACKGROUND ART

In the field of construction polymeric sheets, which are often referred to as membranes or panels, are used to protect underground and above ground constructions, such as basements, tunnels, and roofs, against penetration of water. Waterproofing membranes are applied, for example, to prevent ingress of water through cracks that develop in the concrete structure due to building settlement, load deflection or concrete shrinkage. Roofing membranes are used for waterproofing of flat and low-sloped roof structures. State-of-the-art waterproofing and roofing membranes are single- or multiple-layer systems comprising at least one polymer-based barrier layer to provide watertightness.

Commonly used materials for the barrier layer include plastics, in particular thermoplastics such as plasticized polyvinylchloride (p-PVC), thermoplastic polyolefins (TPO), and elastomers such as ethylene-propylene diene monomer (EPDM). Thermoplastic polyolefins are heterophase polyolefin compositions containing a high crystallinity base polyolefin and a low-crystallinity or amorphous polyolefin modifier. Membranes based on crosslinked EPDM are very flexible and resistant to weathering but they are not heat-weldable due to the chemically crosslinked structure. Membranes composed of TPOs are heat-weldable and less expensive than EPDM-membranes but they are also somewhat more rigid, which can be a disadvantage in some applications.

Membranes based on plasticized PVC are more flexible than TPO membranes but they contain environmentally harmful plasticizers and heavy metal additives such as flame retardants that may restrict their use in some applications.

In waterproofing applications, the membrane can be post-applied to an existing concrete structure or pre-applied before the concrete structure to be waterproofed is built. In the first case, the membrane is adhered to a surface of the concrete structure to be waterproofed via a layer of an adhesive or by using a sealing tape. In pre-applied waterproofing applications, the membrane is placed with its barrier layer facing against the surface of the underlying structure or formwork and fresh concrete is then cast against the surface of the opposite surface of the membrane thereby fully and permanently bonding the membrane to the surface of the hardening concrete.

One of the well-known disadvantages of polymer-based barrier layers is their poor bonding properties; they typically show low bonding strength to adhesives that are commonly used in the construction industry, such as epoxy adhesives, polyurethane adhesives, and cementitious compositions. Therefore, a contact layer, for example, a fleece backing, is typically used to improve the bonding of the polymer-based barrier layer to the structure to be waterproofed. Some of the commercially available membranes for pre-applied waterproofing applications comprise a barrier layer and a layer of non-woven fabric as a contact layer, which is adhered to the barrier layer via an adhesive layer. The adhesive layer is used to secure the contact layer to the barrier layer but also to enable improved bonding between the barrier layer and fresh concrete casted against the contact layer. However, the presence of the adhesive layer increases the production costs of these types of waterproofing membranes and the layer of non-woven fabric, which is typically a fleece, in practice prevents the sealing of seams formed between overlapped edges of membranes by heat-welding.

Patent application WO2017/108843 A1 discloses a waterproofing membrane comprising a polymer-based barrier layer and a contact layer composed of a thermoplastic polymer composition comprising high amounts of mineral fillers, such as mineral binders. The waterproofing membrane can be produced by co-extruding melt-processed compositions of the barrier layer and the functional layer and bonding the thus obtained layers to each other, for example, using calendaring cooling rolls. Waterproofing membranes disclosed in WO2017/108843 A1 provide high adhesion strength to concrete in pre-applied waterproofing applications when the concrete has been casted against the surface of the contact layer and let to harden for 28 days under normal atmospheric conditions. Despite of building a high bonding strength with fresh concrete after hardening, the waterproofing membranes of WO2017/108843 A1 have also been found to provide less than optimal early adhesion strength to the casted concrete, i.e. adhesion strength obtained the casted concrete has been let to harden for one day under normal atmospheric conditions. The low early adhesion strength to the casted concrete can result in detachment of the pre-applied waterproofing membrane since a formwork used in casting of a concrete structure, such as a base slab, is typically removed after 24 hours of hardening of the casted concrete.

There is thus a need for a novel type of waterproofing membrane, which builds high early adhesion strength with fresh concrete casted on the surface of the membrane in pre-applied waterproofing applications.

SUMMARY OF THE INVENTION

The objective of the present invention is to provide a sealing device, which can be used to protect surfaces against water penetration, for example in basement waterproofing, roofing and tunneling applications, and which fully and permanently bonds to concrete and other cementitious compositions cast onto the sealing device after hardening, as well as to adhesives commonly used in the construction industry.

Another objective of the present invention is to provide a sealing device, which builds high early adhesion strength to concrete and other cementitious compositions cast onto the surface of the sealing device after one day of hardening.

It was surprisingly found that a sealing device comprising a barrier layer and a functional layer based on a highly-filled thermoplastic polymer composition and having a high surface roughness provides high early adhesion strength to concrete cast onto the surface of the functional layer after hardening.

The subject of the present invention is a sealing device according to claim 1.

One of the advantages of the sealing device of the present invention is that the formwork can be removed after 24 hours of hardening without the risk of detachment of the sealing device from a vertical surface of the casted concrete body.

Another advantage of the sealing device of the present invention is that the increased surface roughness can be achieved by using a State-of-the-Art foam extrusion process, which is easy to implement and which does not significantly increase the production costs of sealing device compared to a State-of-the-Art sealing device produced by co-extrusion without the use of a blowing gas.

Other aspects of the present invention are presented in other independent claims. Preferred aspects of the invention are presented in the dependent claims.

DETAILED DESCRIPTION OF THE INVENTION

Figure 1:
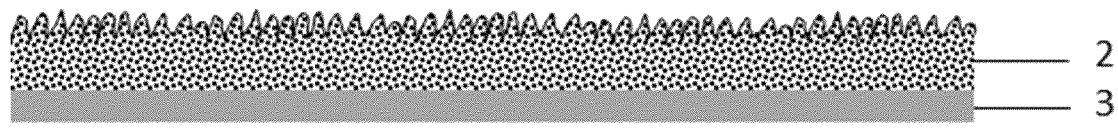
FIG. 1 shows a cross-section of a sealing device (1) of the present invention comprising a functional layer (2) having a first and second major surfaces and a barrier layer (3) directly connected to the second major surface of the functional layer (2).
Figure 2:
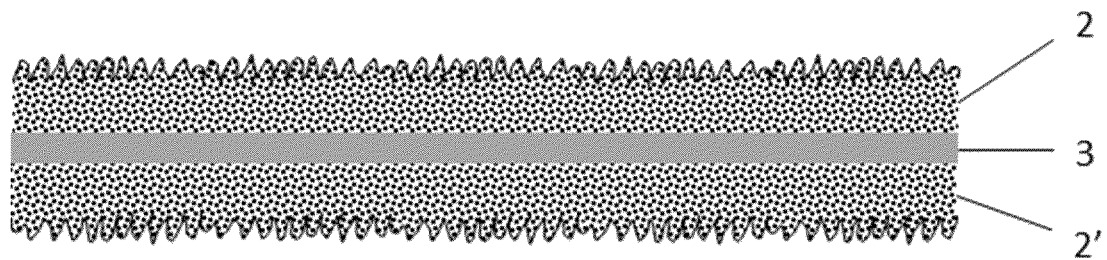
FIG. 2 shows a cross-section of a sealing device (1) of the present invention comprising a first functional layer (2), a second functional layer (2') and a barrier layer (3), wherein the first major surface of the barrier layer (3) is directly connected to the second major surface of the first functional layer (2) and the second major surface of the barrier layer (3) is directly connected to the first major surface of the second functional layer (2').
Figure 3:
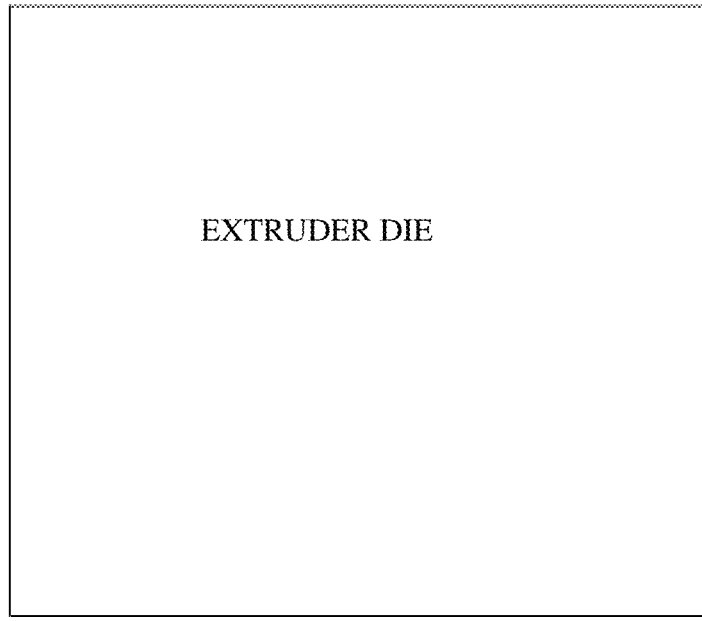
FIG. 3 shows a schematic representation of an extruder die.
Figure 4:
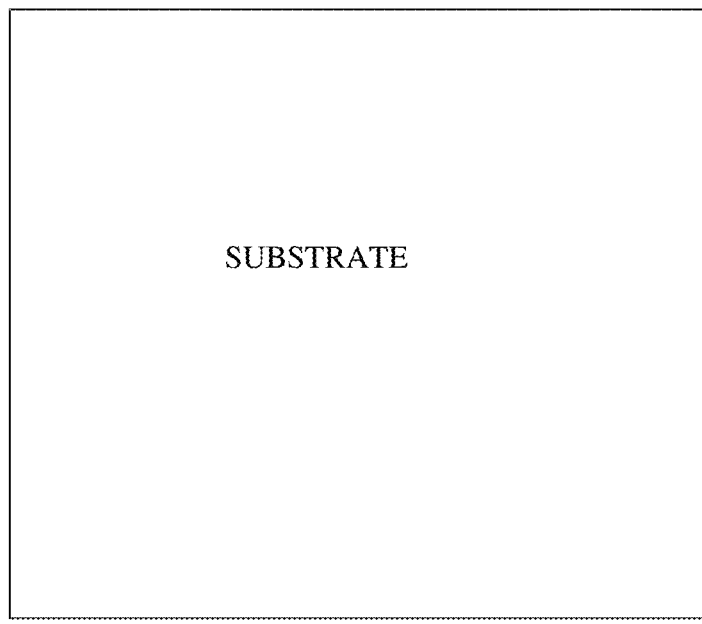
FIG. 4 shows a schematic representation of a substrate.

The subject of the present invention is a sealing device (1) comprising a functional layer (2) having a first major surface and a second major surface and a barrier layer (3) directly or indirectly connected to the second major surface of the functional layer (2), the functional layer (2) comprising:
  a) 20-75 wt.-%, preferably 25-70 wt.-%, of at least one thermoplastic polymer P1 and
  b) 25-80 wt.-%, preferably 30-75 wt.-%, of at least one solid filler F, all proportions being based on the total weight of the functional layer (2), wherein
  the first major surface of the functional layer (2) has a surface roughness characterized by a waviness factor $W_f$, determined as the product of the root mean square roughness of waviness $W_{Sq}$ and peak density of waviness $W_{Spd}$, of at least 0.0125 1/mm, preferably at least 0.0135 1/mm, more preferably at least 0.0145 1/mm, wherein the waviness parameters $W_{Sq}$ and $W_{Spd}$ are determined according to ISO 25178 standard from a waviness profile obtained from a measured primary profile using a cutoff length $\lambda_c$ of 0.8 mm.

The term "polymer" refers to a collective of chemically uniform macromolecules produced by a polyreaction (polymerization, polyaddition, polycondensation) where the macromolecules differ with respect to their degree of polymerization, molecular weight and chain length. The term also comprises derivatives of said collective of macromolecules resulting from polyreactions, that is, compounds which are obtained by reactions such as, for example, additions or substitutions, of functional groups in predetermined macromolecules and which may be chemically uniform or chemically non-uniform.

The term "thermoplastic" refers to any polymer material which can be melted and re-solidified with little or no change in physical properties.

The term "molecular weight" refers to the molar mass (g/mol) of a molecule or a part of a molecule, also referred to as "moiety". The term "average molecular weight" refers to number average molecular weight ($M_n$) of an oligomeric or polymeric mixture of molecules or moieties. The molecular weight can be determined by conventional methods, preferably by gel permeation-chromatography (GPC) using polystyrene as standard, styrene-divinylbenzene gel with porosity of 100 Angstrom, 1000 Angstrom and 10000 Angstrom as the column, and tetrahydrofurane as a solvent, at a temperature of 35° C.

The term "glass transition temperature" ($T_g$) refers to the temperature above which temperature a polymer component becomes soft and pliable, and below which it becomes hard and glassy. The glass transition temperature ($T_g$) is preferably determined by dynamical mechanical analysis (DMA) as the peak of the measured loss modulus (G") curve using an applied frequency of 1 Hz and a strain level of 0.1%.

The term "softening point" refers to a temperature at which compound softens in a rubber-like state, or a temperature at which the crystalline portion within the compound melts. The softening point can be determined by Ring and Ball measurement conducted according to DIN EN 1238 standard.

The term "melting temperature" refers to a temperature at which a material undergoes transition from the solid to the liquid state. The melting temperature ($T_m$) is preferably determined by differential scanning calorimetry (DSC) according to ISO 11357 standard using a heating rate of 2° C./min. The measurements can be performed with a Mettler Toledo DSC 3+ device and the $T_m$ values can be determined from the measured DSC-curve with the help of the DSC-software. In case the measured DSC-curve shows several peak temperatures, the first peak temperature coming from the lower temperature side in the thermogram is taken as the melting temperature ($T_m$).

The "amount or content of at least one component X" in a composition, for example "the amount of the at least one thermoplastic polymer P1" refers to the sum of the individual amounts of all thermoplastic polymers P1 contained in the composition. For example, in case the composition comprises 20 wt.-% of at least one thermoplastic polymer P1, the sum of the amounts of all thermoplastic polymers P1 contained in the composition equals 20 wt.-%.

The term "normal room temperature" refers to the temperature of 23° C.

The functional layer and the barrier layer are preferably sheet-like elements having a length and width at least 5 times, preferably at least 25 times, more preferably at least 50 times greater than the maximum thickness of the element. The term "major surface" refers in the present disclosure to the top and bottom surfaces of a sheet-like element defining the thickness of the element there between.

In waterproofing applications, one of the most important characteristics is the strength of adhesion by which a membrane is bonded to a substrate, for example a concrete surface, to be sealed against water penetration. In case the strength of adhesion is too low, gaps are more easily formed between the membrane and the surface of the substrate, which may lead to loss of water tightness.

It has been found out that in pre-applied waterproofing applications, in which the sealing of the present invention is applied before the concrete structure to be waterproofed is formed, the adhesion strength of the sealing device to formed concrete structure, in particular the early adhesion strength determined after 24 hours of hardening of the casted concrete, can be significantly improved by increasing the surface roughness of the functional layer, on which the fresh concrete is casted.

The observed increase of strength of adhesion to concrete in pre-applied waterproofing applications is believed to result from the increased volume of the pores and cavities present on the outer exterior surface of the functional layer, which enables a faster formation of a mechanical bond between the functional layer and the casted concrete. It has also been found out that a functional layer having the desired surface roughness can be easily obtained by using a foam extrusion process, in which a molten polymer composition comprising the constituents of the functional layer and a blowing gas is extruded through an extruder die. The blowing gas is released from the molten polymer composition upon discharge from the extruder die, wherein the functional layer is first inflated and its surface is eventually penetrated by the released blowing gas resulting in formation of pores and/or cavities and other surface imperfections, which can be characterized as "surface roughness" of the functional layer.

The sealing device of the present invention comprises a functional layer having a first and second major surfaces and a barrier layer, which is indirectly or directly connected to the second major surface of the functional layer, wherein the first major surface of the functional layer has a surface roughness characterized by a waviness factor $W_f$ of at least 0.0125 1/mm, preferably 0.0135 1/mm, more preferably 0.0145 1/mm, even more preferably 0.0155 1/mm, still more preferably 0.0165 1/mm, wherein the waviness factor $W_f$ is determined as the product of the root mean square roughness of waviness $W_{Sq}$ and peak density of waviness $W_{Spd}$ and wherein the waviness parameters $W_{Sq}$ and $W_{Spd}$ are determined according to ISO 25178 standard from a waviness profile obtained from a measured primary profile using a cutoff length $\lambda_c$ of 0.8 mm.

The root mean square roughness of waviness $W_{Sq}$ and peak density of waviness $W_{Spd}$ are standardized three-dimensional (3D) areal parameters, which are calculated from a waviness profile as defined in ISO 25178 standard.

The term "waviness" is commonly used to refer the surface irregularities having a significantly longer wavelength than the irregularities associated with "roughness" of a surface. The 3D areal parameters according to ISO 25178 standard can be calculated based on a waviness profile or based on a roughness profile of a surface, wherein the waviness profile can be obtained from a measured primary profile of a surface using a suitable profile cutoff filters $\lambda_c$ and optionally $\lambda_f$.

The term "measured primary profile" refers in the present disclosure to the primary profile defined in the ISO 25178 as "SF surface", which is obtained from a measured surface geometry (extracted surface) using F-operator and optionally S-filter. The surface geometry can be measured, for example, using a 3D-scanner smartSCAN (trademark of AICON 3D Systems GmbH). In case of the present invention, the primary profile of the first major surface of the functional layer was obtained by subtracting a polynomial of second degree fitted with the measured data points from the measured surface geometry and a cutoff length $\lambda_c$ of 0.8 mm was used to obtain the waviness profile from a measured primary profile. The primary profile, waviness profile, and the 3D areal parameters according to ISO 25178 standard are preferably determined using a suitable computer software, such as a MountainsMap® Premium (V7) software (trademark of DigitalSurf company).

Sealing devices comprising a functional layer having the composition as defined in claim 1 and a surface roughness of the first major surface falling within the above presented ranges have been found out to provide a high early adhesion strength determined after 24 hours of hardening of the fresh concrete casted on the first major surface of the functional layer. In particular, such sealing devices have been found out to have an early adhesion strength, which enables the use of the sealing device in pre-applied waterproofing applications, wherein the sealing device is positioned on a vertical surface of a formwork, which is removed within 24 hours after casting of the concrete structure.

Furthermore, it has been found out that the sealing device exhibits an early concrete adhesion strength of at least 10 N/50 mm, preferably at least 15 N/50 mm determined as average peel resistance per unit width of the sealing device upon peeling the sealing device from a surface of a concrete specimen, which has been casted on the first major surface of the functional layer and hardened for 24 hours under standard atmosphere (air temperature 23° C., relative air humidity 50%).

According to one or more embodiments, the functional layer comprises 25-65 wt.-%, preferably 30-60 wt.-%, more preferably 30-55 wt.-% of the at least one thermoplastic polymer P1 and 35-75 wt.-%, preferably 40-75 wt.-%, more preferably 40-70 wt.-% of the at least one solid filler F, all proportions being based on the total weight of the functional layer.

According to one or more embodiment, the sum of the amounts of the at least one thermoplastic polymer P1 the at least one solid filler F comprises at least 85 wt.-%, preferably at least 90 wt.-%, more preferably at least 92.5 wt.-%, even more preferably at least 95 wt.-% of the total weight of the functional layer.

The at least one solid filler F is preferably present in the functional layer as individual solid particles or as aggregates of one or more solid particles, which are dispersed in a continuous phase comprising the at least one thermoplastic polymer P1. The expression "dispersed in a continuous phase" is understood to mean that the individual solid particles or aggregates of one or more particles are at least partially, preferably completely surrounded by the continuous phase comprising the at least one thermoplastic polymer. In case the functional layer contains one or more mineral binders, i.e. mineral fillers that undergo a hydration reaction in the presence of water, it is essential that these do not form interconnected solid networks of hydrated mineral binders within the functional layer. Consequently, it may be preferred that the functional layer is essentially free, more preferably completely free, of interconnected solid networks of hydrated mineral binders at least before the sealing devices is used for waterproofing of a substrate.

Preferably, the at least one filler F has:
- a $d_{98}$ particle size of not more than 750 μm, more preferably not more than 500 μm, even more preferably not more than 350 μm, still more preferably not more than 250 μm and/or
- a median particle size $d_{50}$ of not 350 μm, more preferably not more than 250 μm, even more preferably not more than 150 μm, still more preferably not more than 100 μm and/or
- $d_{10}$ particle size of not more than 100 μm, more preferably not more than 75 μm, even more preferably not more than 50 μm, still more preferably not more than 25 μm.

The term "particle size" refers in the present disclosure to the area-equivalent spherical diameter of a particle ($X_{area}$).

The term $d_{90}$ particle size refers in the present disclosure to a particle size below which 90% of all particles by volume are smaller than the $d_{90}$ value. In analogy, the term "median particle size $d_{50}$" refers to a particle size below which 50% of all particles by volume are smaller than the $d_{50}$ value and the term "$d_{10}$ particle size" refers to a particle size below which 10% of all particles by volume are smaller than the $d_{10}$ value. The particle size distribution can be measured by laser diffraction according to the method as described in standard ISO 13320:2009. For determination of the particle size distribution, the particles are preferably suspended in water (wet dispersion method). A Mastersizer 2000 device (trademark of Malvern Instruments Ltd, GB) can be used in measuring particle size distribution.

According to one or more embodiments, the at least one solid filler F has a median particle size $d_{50}$ in the range of 0.1-150 μm, preferably 0.5-100 μm, more preferably 0.5-75 μm, even more preferably 1.0-50 μm, still more preferably 1.0-25 μm, most preferably 1.0-15 μm.

Preferably, the particles of the at least one solid filler F are distributed throughout the entire volume of the functional layer. The term "distributed throughout" means that essentially all portions of the functional layer contain particles of the at least one solid filler F but it does not necessarily imply that the distribution of the particles is completely uniform throughout the functional layer.

It may also be preferable that the functional layer comprises a homogeneously mixed mixture of the at least one thermoplastic polymer P1 and the at least one solid filler F. A "homogeneously mixed mixture" refers in the present disclosure to compositions, in which the individual constituents are distributed substantially homogeneously in the composition. A homogeneously mixed mixture of the at least one thermoplastic polymer P1 and the at least one solid filler F refers, therefore, to compositions in which the particles of the at least one solid filler F are homogeneously/uniformly distributed in a thermoplastic polymer phase comprising the at least one thermoplastic polymer P1. For a person skilled in the art it is clear that within such mixed compositions there may be regions formed, which have a slightly higher concentration of one of the constituents than other regions and that a 100% homogeneous distribution of all the constituents is generally not achievable. Such mixed compositions with "imperfect" distribution of constituents, however, are also intended to be included by the term "homogeneously mixed mixture" in accordance with the present invention.

The type of the at least one solid filler F is not particularly restricted in the present invention. According to one or more embodiments, the at least one solid filler F is selected from the group consisting of inert mineral fillers, hydraulic binders, non-hydraulic binders, latent hydraulic binders, pozzolanic binders and synthetic organic fillers.

According to one or more embodiment, the at least one solid filler F comprises at least one inert mineral filler F1. Generally, the expression "the at least one component X comprises at least one component XN", such as "the at least one solid filler F comprises at least one inert mineral filler F1" is understood to mean in the context of the present disclosure that the functional layer comprises one or more inert mineral fillers F1 as representatives of the at least one solid filler F.

The term "inert mineral filler" refers to mineral fillers, which, unlike hydraulic binders do not undergo a hydration reaction in the presence of water. Suitable mineral fillers to be used as the at least one inert mineral filler F1 include, for example, sand, granite, calcium carbonate, magnesium carbonate, clay, expanded clay, diatomaceous earth, pumice, mica, kaolin, talc, dolomite, xonotlite, perlite, vermiculite, Wollastonite, barite, cristobalite, silica, fumed silica, fused silica, glass beads, hollow glass spheres, ceramic spheres, bauxite, comminuted concrete, and zeolites.

The term "sand" refers in the present document mineral clastic sediments (clastic rocks) which are loose conglomerates (loose sediments) of round or angular small grains, which were detached from the original grain structure during the mechanical and chemical degradation and transported to their deposition point, said sediments having an $SiO_2$ content of greater than 50 wt.-%, in particular greater than 75 wt.-%, particularly preferably greater than 85 wt.-%. The term "calcium carbonate" when used as inert mineral filler refers to solid particulate substances produced from chalk, limestone or marble by grinding and/or precipitation.

According to one or more embodiments, the at least one inert mineral filler is selected from the group consisting of sand, granite, calcium carbonate, magnesium carbonate, clay, expanded clay, diatomaceous earth, pumice, mica, kaolin, talc, potash, dolomite, xonotlite, perlite, vermiculite, Wollastonite, barite, cristobalite, silica (quartz), fumed silica, fused silica, bauxite, comminuted concrete, and zeolites, preferably from the group consisting of calcium carbonate, magnesium carbonate, diatomaceous earth, pumice, mica, talc, dolomite, xonotlite, perlite, vermiculite, Wollastonite, barite, and comminuted concrete.

According to one or more embodiment, the at least one solid filler F comprises at least one hydraulic binder F2.

The term "hydraulic binder" refers to substances, which react with water in a hydration reaction under formation of solid mineral hydrates or hydrate phases, which are not soluble in water or have a low water-solubility. Therefore, hydraulic binders, such as Portland cement, can harden and retain their strength even when exposed to water, for example underwater or under high humidity conditions. In contrast, the term "non-hydraulic binder" refers to substances, which harden by reaction with carbon dioxide and which, therefore, do not harden in wet conditions or under water.

Examples of suitable hydraulic binders to be used as the at least one hydraulic binder include hydraulic cements and hydraulic lime. The term "hydraulic cement" refers here to mixtures of silicates and oxides including alite, belite, tricalcium aluminate, and brownmillerite.

Commercially available hydraulic cements can be divided in five main cement types according to DIN EN 197-1, namely, Portland cement (CEM I), Portland composite cements (CEM II), blast-furnace cement (CEM III), pozzolan cement (CEM IV) and composite cement (CEM V). These five main types of hydraulic cement are further subdivided into an additional 27 cement types, which are known to the person skilled in the art and listed in DIN EN 197-1. Naturally, all other hydraulic cements that are produced according to another standard, for example, according to ASTM standard or Indian standard are also suitable for use as at least one hydraulic binder F2.

According to one or more embodiments, the at least one solid filler F comprises at least one non-hydraulic binder F3.

Examples of suitable non-hydraulic binders to be used as the at least one non-hydraulic binder F3 include air-slaked lime (non-hydraulic lime) and gypsum. The term "gypsum" refers in the present disclosure to any known form of gypsum, in particular calcium sulfate dehydrate, calcium sulfate α-hemihydrate, calcium sulfate β-hemihydrate, or calcium sulfate anhydrite or mixtures thereof.

According to one or more embodiments, the at least one solid filler F comprises at least one latent hydraulic binder F4.

The term "latent hydraulic binder" refers in the present disclosure to type II concrete additives with a "latent hydraulic character" as defined in DIN EN 206-1:2000 standard. These types of mineral binders are calcium aluminosilicates that are not able to harden directly or harden too slowly when mixed with water. The hardening process is accelerated in the presence of alkaline activators, which break the chemical bonds in the binder's amorphous (or glassy) phase and promote the dissolution of ionic species and the formation of calcium aluminosilicate hydrate phases.

Examples of suitable latent hydraulic binders to be used as the at least one latent hydraulic binder F4 include ground granulated blast furnace slag. Ground granulated blast furnace slag is typically obtained from quenching of molten iron slag from a blast furnace in water or steam to form a glassy granular product and followed by drying and grinding the glassy into a fine powder.

According to one or more embodiments, the at least one solid filler F comprises at least one pozzolanic binder F5.

The term "pozzolanic binder" refers in the present disclosure to type II concrete additives with a "pozzolanic character" as defined in DIN EN 206-1:2000 standard. These types of mineral binders are siliceous or aluminosilicate compounds that react with water and calcium hydroxide to form calcium silicate hydrate or calcium aluminosilicate hydrate phases.

Examples of suitable pozzolanic binders to be used as the at least one pozzolanic binder F5 include natural pozzolans, such as trass, and artificial pozzolans, such as fly ash and silica fume. The term "fly ash" refers in the present disclosure to the finely divided ash residue produced by the combustion of pulverized coal, which is carried off with the gasses exhausted from the furnace in which the coal is burned. The term "silica fume" refers in the present disclosure to fine particulate silicon in an amorphous form. Silica fume is typically obtained as a by-product of the processing of silica ores such as the smelting of quartz in a silica smelter which results in the formation of silicon monoxide gas and which on exposure to air oxidizes further to produce small particles of amorphous silica.

According to one or more embodiment, the at least one solid filler F comprises at least one synthetic organic filler F6.

Suitable synthetic organic materials to be used as the at least one synthetic organic filler F6 include in particular plastic materials having a melting temperature ($T_m$) determined by DSC according to ISO 11357 standard of at or above 250° C., preferably at or above 275° C., such as polyamide, aramid, epoxide, polystyrene, expanded polystyrene, polyethylene terephthalate (PET), poly(phenyl ethers), polysulfones, and polyethersulfones.

According to one or more embodiments, the at least one solid filler F comprises or consists of the at least one inert mineral filler F1, preferably selected from the group consisting of calcium carbonate, magnesium carbonate, diatomaceous earth, pumice, dolomite, xonotlite, perlite, barite, and comminuted concrete, more preferably from the group consisting of calcium carbonate and magnesium carbonate and/or the at least one hydraulic binder F2, preferably selected from the group consisting of Portland cement (CEM I), Portland composite cements (CEM II), blast-furnace cement (CEM III), pozzolan cement (CEM IV) and composite cement (CEM V).

The type of the at least one thermoplastic polymer P1 is not particularly restricted in the present invention.

According to one or more embodiments, the at least one thermoplastic polymer P1 has:
 a melting temperature ($T_m$) determined by DSC according to ISO 11357 standard in the range of 55-250° C., preferably 60-200° C., more preferably 65-175° C., even more preferably 70-165° C., still more preferably 75-155° C. and/or
 a melt flow rate a melt flow rate determined according to ISO 1133 (190° C./2.16 kg) of not more than 250 g/10 min, preferably not more than 150 g/10 min, more preferably not more than 100 g/10 min, even more preferably not more than 50 g/10 min, still more preferably not more than 25 g/10 min and/or
 a glass transition temperature ($T_g$) determined by dynamical mechanical analysis (DMA) as the peak of the measured loss modulus (G") curve using an applied frequency of 1 Hz and a strain level of 0.1% of at or below 0° C., preferably at or below −10° C., more preferably at or below −20° C., even more preferably at or below −25° C., still more preferably at or below −30° C. and/or
 a flexural modulus at 23° C. determined according to ISO 178 standard of not more than 700 MPa, preferably not more than 500 MPa, more preferably not more than 350 MPa, even more preferably not more than 250 MPa, still more preferably not more than 150 MPa, most preferably not more than 100 MPa.

Suitable polymers to be used as the at least one thermoplastic polymer P1 include, for example, ethylene-vinyl acetate copolymer (EVA), ethylene-acrylic ester copolymers, ethylene-α-olefin co-polymers, ethylene-propylene co-polymers, propylene-α-olefin co-polymers, propylene-ethylene co-polymers, polyethylene (PE), polypropylene (PP), polyvinylchloride (PVC), polyethylene terephthalate (PET), polystyrene (PS), polyamides (PA), chlorosulfonated polyethylene (CSPE), ethylene propylene diene monomer rubber (EPDM), and polyisobutylene (PIB).

According to one or more embodiments, the at least one thermoplastic polymer P1 is selected from the group consisting of low-density polyethylene, linear low-density polyethylene, high-density polyethylene, ethylene-vinyl acetate copolymer (EVA), ethylene-acrylic ester copolymers, ethylene-α-olefin copolymers, ethylene-propylene copolymers, propylene-α-olefin copolymers, propylene-ethylene copolymers, and polypropylene (PP), preferably from the group consisting of low-density polyethylene, linear low-density polyethylene, high-density polyethylene, ethylene-vinyl acetate copolymer (EVA), ethylene-α-olefin copolymers, and ethylene-propylene copolymers.

According to one or more embodiments, the at least one thermoplastic polymer comprises at least one ethylene vinyl acetate copolymer P11 and at least one thermoplastic polymer P12 that is not an ethylene vinyl acetate copolymer, preferably selected from the group consisting of low-density polyethylene, linear low-density polyethylene, high-density polyethylene, ethylene-α-olefin copolymers, and ethylene-propylene copolymers.

According to one or more embodiments, the ratio of the amounts of the at least one ethylene vinyl acetate copolymer P11 and the at least one thermoplastic polymer P12 that is not an ethylene vinyl acetate copolymer is in the range of from 5:1 to 1:5, preferably from 3:1 to 1:3, more preferably from 3:1 to 1:3.

According to one or more embodiments, the functional layer further comprises at least one surfactant SF. The term "surfactant" refers to surface tension lowering substances, which are typically organic compounds containing both hydrophobic and hydrophilic groups. Surfactants are commonly classified, based on the charge of their hydrophilic groups, to anionic, cationic, amphoteric, non-ionic, and polymeric surfactants. Without being bound to any theory, the presence of surfactants in the functional layer may lower the surface tension of water contained in a fresh concrete casted on the functional layer, which may further enhance the ability of the fresh concrete to enter the cavities and pores present on the first major surface of the functional layer.

Examples of suitable anionic surfactants to be used as the at least one surfactant SF include, for example, surfactants containing carboxylate, sulfate, phosphate or sulfonate groups, such as amino acid derivatives; fatty alcohol ether sulfates; fatty alcohol sulfates; soaps; alkylphenol ethoxylates; fatty alcohol ethoxylates; alkanesulfonates; olefinsulfonates; and alkyl phosphates.

Examples of suitable cationic surfactants to be used as the at least one surfactant SF include, for example, quaternary ammonium or phosphonium compounds, such as, for example, tetraalkylammonium salts; N,N-dialkylimidazoline compounds; dimethyldistearylammonium compounds, N-alkylpyridine compounds; and ammonium chlorides.

Amphoteric (zwitterionic) surfactants have both cationic and anionic centers attached to the same molecule. Examples of suitable amphoteric surfactants to be used as the at least one surfactant SF include, for example, amphoteric electrolytes such as aminocarboxylic acis and betaines.

Examples of suitable non-ionic surfactants to be used as the at least one surfactant SF include, for example, ethoxylates, such as, for example, ethoxylated adducts of alcohols, such as polyoxyalkylene polyols; amines; fatty acids; fatty acid amides; alkylphenols; ethanolam ides; fatty amines; polysiloxanes; fatty acid esters; alkyl or alkylphenyl polyglycol ethers, such as, for example, fatty alcohol polyglycol ethers; alkylglycosides; sugar esters; sorbitan esters; polysorbates or trialkylamine oxides; esters and amides of poly(meth)acrylic acids with polyalkylene glycols or aminopolyalkylene glycols, which at most may be tacked at one end with alkyl groups.

Polymeric surfactants can be divided into two groups of compounds. The first group includes comb or rake polymers where there is an organic polymeric chain with hydrophobic groups at regular intervals along the chain and hydrophilic groups at random or regular intervals along that chain. The second group of polymeric surfactants includes block co-polymers where there are blocks of hydrophobic groups (B) and blocks of hydrophilic groups (A) usually in A-B-A configuration. Certain polymeric surfactants such as ethylene oxide-propylene oxide co-polymer surfactants can also be classified as non-ionic surfactants.

According to one or more embodiments, the at least one surfactant SF is selected from the group consisting of glycerol monostearates, polycarboxylate ethers, polyether-modified polysiloxanes, polyalkylene oxide siloxanes, hydroxyethyl amines, erucamides, stearyl stearamides, alkali metal alkanesulfonates, and alkyl aryl sulfonates.

Suitable glycerol monostearates are commercially available, for example, under the trade name of Dimodan® HP (from Danisco).

Suitable polycarboxylate ethers include polycarboxylate ether-based superplasticizers (PCEs), which are composed by a methoxy-polyethylene glycol copolymer (side chain) grafted with methacrylic acid copolymer (main chain). Suitable polycarboxylate ether-based superplasticizers are commercially available, for example, under the trade names of Viscocrete® Polymer PC-2, Viscocrete® Polymer RMC-2, Viscocrete® 125 P, and Cemerol® R-750 MC (from Sika AG).

Suitable polyether-modified polysiloxanes include polyetherpolysiloxane copolymers, which are commercially available, for example, under the trade name of Tegostab® B8870 (from Evonik Industries).

Suitable polyalkylene oxide siloxanes are commercially available, for example, under the trade name of Niax® L-1500 (from Momentive).

Examples of suitable hydroxyethyl amines include bis(2-hydroxyethyl) amines, which are commercially available, for example, under the trade name of Armostat® 300 (from Akzo Nobel).

Suitable erucamides and stearyl stearamides are commercially available, for example, under the trade names of Kemamide® E180 and Kemamide® S180 (from PMC Biogenix).

Examples of suitable alkali metal alkanesulfonates include sodium alkanesulfonates, which are commercially available, for example, under the trade names of Armostat® 3002 (from Akzo Nobel) and Loxiol® 93P (from Emery Oleochemicals).

Suitable alkylarylsulfonates are commercially available, for example, under the trade name of ZetaSphere®, such as ZetaSphere® 2300, ZetaSphere® 3100 and ZetaSphere® 3700 (from Airproducts).

The at least one surfactant SF preferably comprises, if present in the functional layer, at least 0.01 wt.-%, more preferably at least 0.05 wt.-%, even more preferably at least 0.1 wt.-% of the total weight of the functional layer. It is also preferred that the amount of the at least one surfactant SF in the functional layer is not more than 10 wt.-%, more preferably not more than 5 wt.-%, even more preferably not more than 3.5 wt.-%, based on the total weight of the functional layer.

According to one or more embodiments, the at least one surfactant SF comprises 0.05-7.5 wt.-%, preferably 0.1-5.0 wt.-%, more preferably 0.25-3.5 wt.-%, even more preferably 0.5-3.0 wt.-%, still more preferably 0.5-2.5 wt.-% of the total weight of the functional layer.

The thickness of the functional layer typically varies along the length and width of the sealing device due to the unsymmetrical surface structure present in the first major surface of the functional layer. Some of the pores and cavities of the functional layer may even reach the first major surface of the barrier layer, in which case the thickness of the functional layer measured at such particular location may not even be measurable. However, it may be preferred that the functional layer has a maximum thickness of not more than 25 mm, preferably not more than 15 mm, more preferably not more than 10 mm, even more preferably not more than 5 mm, still more preferably not more than 2.5 mm. In the context of the present invention, the maximum thickness of the functional layer can be determined according to DIN EN 1849-2 standard using an optical microscope, such as of type Keyence VHX-600 with 30-fold magnification.

In addition to the surface roughness of the first major surface of the functional layer, it has also been found out that the mass per unit area of the functional layer also affects early adhesion strength obtained with the sealing device in pre-applied waterproofing applications. It may, therefore, be preferred that the functional layer has a mass per unit area of at least 100 g/m$^2$, more preferably at least 150 g/m$^2$, even more preferably at least 200 g/m$^2$. According to one or more embodiments, the functional layer has a mass per unit weight in the range of 100-1500 g/m², preferably 150-1250 g/m², more preferably 250-1000 g/m², even more preferably 350-1000 g/m², still more preferably 450-1000 g/m², most preferably 500-1000 g/m².

The functional layer may further comprises one or more additives such as UV- and heat stabilizers, antioxidants, plasticizers, flame retardants, dyes, pigments such as titanium dioxide and carbon black, matting agents, antistatic agents, impact modifiers, biocides, and processing aids such as lubricants, slip agents, antiblock agents, and denest aids. It is preferred, that the total amount of these types of additives comprises not more than 10 wt.-%, preferably not more than 5 wt.-% of the total weight of the functional layer.

The sealing device further comprises a barrier layer, which is indirectly or directly connected to the second major surface of the functional layer.

The functional layer and the barrier layer can be indirectly connected to each other, for example, via a connecting layer, such as a layer of adhesive or via a fiber-based layer, or a combination thereof. In case a porous connecting layer, such as an open weave fabric, the functional layer may be partially directly connected and partially indirectly connected to the barrier layer.

The expression "directly connected" is understood to mean in the context of the present invention that no further layer or substance is present between the layers, and that the opposing surfaces of the two layers are directly bonded to each other or adhere to each other. At the transition area between the two layers, the materials forming the layers can also be present mixed with each other.

According to one or more embodiments, the barrier layer has a first and a second major surface, wherein at least a portion of the first major surface of the barrier layer is directly connected to the second major surface of the functional layer. According to one or more embodiments, at least 50%, preferably at least 75 wt.-%, more preferably at least 95% of the area of the first major surface of the barrier layer is directly connected to the second major surface of the functional layer.

The composition of the barrier layer is not particularly restricted. However, the barrier layer should be as waterproof as possible and not to decompose or be mechanically damaged even under prolonged influence of water or moisture.

It is furthermore preferred that the barrier layer is in the form of a flexible plastic layer. This allows the sealing device to be wound into rolls, typically during production, and then easily applied to a surface of a substrate to be waterproofed. Preferably, the barrier layer has a tensile modulus of elasticity determined according to EN ISO 527-3 of not more than 500 MPa, preferably not more than 350 MPa, more preferably not more than 250 MPa, even more preferably not more than 150 MPa, still more preferably not more than 100 MPa.

According to one or more embodiments, the barrier layer comprises at least 50 wt.-%, preferably at least 65 wt.-%, more preferably at least 75 wt.-%, even more preferably at least 85 wt.-%, even more preferably at least 90 wt.-%, still more preferably at least 95 wt.-% of at least one thermoplastic polymer P2.

According to one or more embodiments, the at least one thermoplastic polymer P2 has:
a melting temperature ($T_m$) determined by DSC according to ISO 11357 standard in the range of 55-250° C.,
preferably 60-200° C., more preferably 65-175° C., even more preferably 70-165° C., still more preferably 75-155° C. and/or
a melt flow rate a melt flow rate determined according to ISO 1133 (190° C./2.16 kg) of not more than 250 g/10 min, preferably not more than 150 g/10 min, more preferably not more than 100 g/10 min, even more preferably not more than 50 g/10 min, still more preferably not more than 25 g/10 min and/or
a glass transition temperature ($T_g$) determined by dynamical mechanical analysis (DMA) as the peak of the measured loss modulus (G") curve using an applied frequency of 1 Hz and a strain level of 0.1% of at or below 0° C., preferably at or below −10° C., more preferably at or below −20° C., even more preferably at or below −25° C., still more preferably at or below −30° C. and/or
a flexural modulus at 23° C. determined according to ISO 178 standard of not more than 700 MPa, preferably not more than 500 MPa, more preferably not more than 350 MPa, even more preferably not more than 250 MPa, still more preferably not more than 150 MPa, most preferably not more than 100 MPa.

Suitable polymers to be used as the at least one thermoplastic polymer P2 include, for example, ethylene-vinyl acetate copolymer (EVA), ethylene-acrylic ester copolymers, ethylene-α-olefin co-polymers, ethylene-propylene co-polymers, propylene-α-olefin co-polymers, propylene-ethylene co-polymers, polyethylene (PE), polypropylene (PP), polyvinylchloride (PVC), polyethylene terephthalate (PET), polystyrene (PS), polyamides (PA), chlorosulfonated polyethylene (CSPE), ethylene propylene diene monomer rubber (EPDM), and polyisobutylene (PIB).

According to one or more embodiments, the at least one thermoplastic polymer P2 is selected from the group consisting of low-density polyethylene, linear low-density polyethylene, high-density polyethylene, ethylene-vinyl acetate copolymer (EVA), ethylene-acrylic ester copolymers, ethylene-α-olefin copolymers, ethylene-propylene copolymers, propylene-α-olefin copolymers, propylene-ethylene copolymers, and polypropylene (PP), preferably from the group consisting of low-density polyethylene, linear low-density polyethylene, high-density polyethylene, ethylene-vinyl acetate copolymer (EVA), ethylene-α-olefin copolymers, and ethylene-propylene copolymers.

It may be preferred that the at least one thermoplastic polymer P2 contained in the barrier layer is miscible with the at least one thermoplastic polymer P1 contained in the functional layer. By the polymers being "miscible" is meant in the present disclosure that a polymer blend composed of the at least one thermoplastic polymer P1 and the at least one thermoplastic polymer P2 has a negative Gibbs free energy and heat of mixing. The polymer blends composed of entirely miscible polymer components tend to have one single glass transition temperature ($T_g$).

The barrier layer can further comprise, in addition to the at least one thermoplastic polymer P2, one or more additives such as UV- and heat stabilizers, antioxidants, plasticizers, fillers, flame retardants, dyes, pigments such as titanium dioxide and carbon black, matting agents, antistatic agents, impact modifiers, biocides, and processing aids such as lubricants, slip agents, antiblock agents, and denest aids. It is, however, preferred that the total amount of these types of additives is not more than 45 wt.-%, preferably not more than 35 wt.-%, more preferably not more than 25 wt.-%, even more preferably not more than 15 wt.-%, based on the total weight of the barrier layer.

The thickness of the barrier layer is not subjected to any particular restrictions. However, sealing devices comprising a barrier layer having a thickness of above 10 mm or below 0.1 mm are usually not practical in waterproofing applications. Preferably, the barrier layer has a thickness of at least 0.1 mm, more preferably at least 0.25 mm. According to one or more embodiments, the barrier layer has a thickness of 0.1-10.0 mm, preferably 0.25-5.0 mm, more preferably 0.3-3.5 mm, even more preferably 0.35-2.5 mm. The thickness of the barrier layer can be determined by using a measurement method as defined in DIN EN 1849-2 standard.

The sealing device of the present invention can be provided in a form of prefabricated article, which is delivered to the construction site in form of rolls, which are then unwounded and cut to provide sheets having a length that exceed the width of the sheets. The term "width" and "length" refer to the two perpendicular dimensions measured in the horizontal plane of the top and bottom surfaces of a sheet. Generally, the "width" of a sheet is the smaller of the horizontal dimensions of the sheet. Consequently, the "width" of the sealing device refers to the minor dimension measured in the horizontal plane of the barrier layer in a direction perpendicular to the length of the barrier layer.

Preferably, the sealing device has a width of not more than 10 m, more preferably not more than 5 m. According to one or more embodiments, the sealing device has a width in the range of 0.5-5 m, preferably 0.75-4 m, more preferably 0.85-3.5 m, even more preferably 1.0-3 m. According to one or more further embodiments, the sealing device has a width in the range of 0.05-1 m, preferably 0.1-0.85 m, more preferably 0.15-0.65 m, even more preferably 0.15-0.5 m.

Especially in case the sealing device is used for waterproofing of roof substrates, it may be preferred that the barrier layer comprises one or more reinforcement layers, which is used for improving the dimensional stability of the barrier layer. It is, however, possible or even preferred that the barrier layer does not contain such reinforcement layers, in particular in case the sealing device is used for waterproofing of underground structures.

The reinforcement layer, if used, may be at least partially embedded, preferably fully embedded into the barrier layer. By the expression "at least partially embedded" is meant that the reinforcement layer is at least partially covered by the matrix of the barrier layer. The type of the reinforcing layer is not particularly restricted. For example, the reinforcing layers commonly used for improving the dimensional stability of thermoplastic waterproofing and roofing membranes can be used. Preferably, the reinforcing layer comprises at least one layer of fiber material, preferably selected from the group consisting of non-woven fabrics, woven fabrics, and non-woven scrims, more preferably from the group consisting of non-woven fabrics and non-woven scrims.

The term "non-woven fabric" refers in the present disclosure to materials composed of fibers, which are bonded together by using chemical, mechanical, or thermal bonding means, and which are neither woven nor knitted. Non-woven fabrics can be produced, for example, by using a carding or needle punching process, in which the fibers are mechanically entangled to obtain the nonwoven fabric. In chemical bonding, chemical binders such as adhesive materials are used to hold the fibers together in a nonwoven fabric.

The term "non-woven scrim" designates in the present disclosure web-like non-woven products composed of yarns, which lay on top of each other and are chemically bonded to each other. Typical materials for non-woven scrims include metals, fiberglass, and plastics, in particular polyester, polypropylene, polyethylene, and polyethylene terephthalate (PET).

According to one or more embodiments, the sealing device further comprises a second functional layer (2') having a first and a second major surface, wherein the second major surface of the barrier layer (3) is directly or indirectly connected to the first major surface of the second functional layer (2') and wherein the second functional layer (2') comprises:
  a) 20-75 wt.-%, preferably 25-70 wt.-% of the at least one thermoplastic polymer P1 and
  b) 25-80 wt.-%, preferably 30-75 wt.-% of the at least one solid filler F, all proportions being based on the total weight of the second functional layer (2').

According to one or more embodiments, the second major surface of the second functional layer has a surface roughness characterized by a waviness factor $W_f$, determined as the product of the root mean square roughness of waviness $W_{Sq}$ and peak density of waviness $W_{Spd}$, of at least 0.0125 1/mm, preferably at least 0.0135 1/mm, more preferably at least 0.0145 1/mm, wherein the waviness parameters $W_{Sq}$ and $W_{Spd}$ are determined according to ISO 25178 standard from a waviness profile obtained from a measured primary profile using a cutoff length $\lambda_c$ of 0.8 mm.

The preferences given above for the functional layer, the barrier layer, the at least one thermoplastic polymer P1, the at least one solid filler F, and the at least one surfactant SF apply equally to all other subjects of the present invention unless stated otherwise.

Another subject of the present invention is a method for producing a sealing device, the method comprising a step of extruding or co-extruding a first molten polymer composition comprising the constituents of the functional layer as defined above through an extruder die, wherein the first molten polymer composition further contains a blowing gas, which is released from the first molten polymer composition through a surface of the functional layer discharged from the extruder die.

After the molten polymer composition is discharged from the extruder die, the functional layer is first inflated due to volume increase of the blowing gas, which results in formation of closed cell structure in the material of the functional layer. Eventually, the surface of the functional layer is penetrated by the blowing gas, which results in formation of open or semi-open cells, pores, cavities, and other surface imperfections which are accessible from the side of the first major surface of the functional layer. The distribution and dimensions of these surface structures, which are accessible from the side of the first major surface of the functional layer, can be characterized using the 3D-surface roughness parameters as discussed above.

In order to prevent a premature release of the blowing gas from the molten polymer composition, i.e. before the molten polymer composition is discharged through the extruder die, the extruder should be operated with closed venting unit(s).

The first molten polymer composition is preferably obtained by melt-processing a first starting composition comprising the constituents of the functional layer. The melt-processing is preferably conducted using an extruder, such as a single or twin-screw extruder or a planetary roller extruder.

The blowing gas released from the first molten polymer composition through the surface of the functional layer is preferably present in the first starting composition or in the first molten polymer composition in form of a physical or chemical blowing agent. In case of a chemical blowing agent, the blowing agent is preferably added to the first starting composition and the blowing gas is generated during the melt-processing of the first starting composition. In case of a physical blowing agent, the blowing agent is preferably added to the first starting composition or to the melt-processed starting composition before the first molten polymer composition is extruded through the extruder die.

Suitable physical blowing agents to be used in the method for producing a sealing device include gaseous and liquid physical blowing agents. Gaseous physical blowing agents, such as compressed nitrogen or carbon dioxide, are can be directly injected under high pressure into the melt-processed starting composition, which is conveyed through a melt-processing apparatus, such as an extruder barrel. Liquid physical blowing agents include volatile liquids which produce gas through vaporization. Suitable liquid physical blowing agents generally include water, short-chain aliphatic hydrocarbons, for example having five to seven carbon atoms, and their halogenated, in particular chlorinated and fluorinated derivatives. Particularly suitable liquid physical blowing agents have a standard boiling point measured at a pressure of 1 bar of not more than 250° C., preferably not more than 200° C. The standard boiling point of a liquid physical blowing agent can be measured using an ebulliometer.

Chemical blowing agents, also known as foaming agents, are typically solids that liberate gas(es) by means of a chemical reaction, such as decomposition, when exposed to higher temperatures. Chemical blowing agents may be either inorganic or organic.

According to one or more embodiments, the first molten polymer composition is obtained by melt-processing a first starting composition comprising the constituents of the functional layer and further at least one chemical blowing agent CBA.

According to one or more embodiments, the at least one chemical blowing agent CBA has a maximum decomposition peak temperature measured by Differential Scanning calorimetry (DSC) in the range of 85-225° C., preferably 95-215° C., more preferably 105-205° C., even more preferably 115-195° C. The maximum decomposition peak measured by DSC is preferably determined by using a DSC822e differential scanning calorimeter from Mettler-Toledo by keeping the sample for 2 min at 25° C., then heating the sample from 25° C. to 280° C. at a rate of 5° C./min, then keeping the sample for 2 min at 280° C. and finally cooling the sample from 280° C. to 25° C. at a rate of 10° C./min.

Suitable substances to be used as the at least one chemical blowing agent CBA include, for example, azodicarbonamide, azobisisobutyronitrile, azocyclohexyl nitrile, dinitrosopentamethylene tetramine, azodiamino benzene, calcium azide, 4,4'-diphenyldisulphonyl azide, benzenesulphonyl hydrazide, 4,4-oxybenzenesulphonyl semicarbazide, 4,4-oxybis(benzenesulphonyl hydrazide), diphenyl sulphone-3,3-disulphonyl hydrazide, p-toluenesulphonyl hydrazide, p-toluenesulphonyl semicarbazide, trihydrazino triazine, N,N'-dimethyl-N,N'-dinitrosoterephthalamide, diazoaminobenzene, diazoaminotoluene, hydrazodicarbonamide, barium azodicarboxylate, 5-hydroxytetrazole, sodium bicarbonate, ammonium carbonate, ammonium bicarbonate, potassium bicarbonate, and organic acids.

Most of the above listed preferable chemical blowing agents, such as sodium bicarbonate, are solid at normal room temperature and are typically provided in powder form. The particle size of such powders is preferably not too low in order to prevent premature decomposition the chemical blowing agent during a premixing process, for example, during premixing of the constituents of the first starting composition. A narrow particle size distribution may also be preferred in order to better control the decomposition temperature the chemical blowing agent.

According to one or more embodiments, the at least one chemical blowing agent CBA is present in the first starting composition in form of solid particles having a median particle size $d_{50}$ in the range of 0.5-100 μm, preferably 1.0-75 μm, more preferably 2.5-50 μm, even more preferably 5-35 μm.

Suitable organic acids for use as the at least one chemical blowing agent CBA include, for example, monocarboxylic acids, such as acetic acid and propionic acid, solid polycarboxylic acids, such as solid, hydroxy-functionalized or unsaturated dicarboxylic, tricarboxylic, tetracarboxylic or polycarboxylic acids, in particular citric acid, tartaric acid, malic acid, fumaric acid, and maleic acid.

Although some of the compounds used in the present invention are characterized as useful for specific functions, it should be understood that the use of these compounds is not limited to their stated functions. For example, it is also possible that some of the substances presented above as chemical blowing agents can also be used as activators for the at least one chemical blowing agent CBA.

For example, commonly used activators for organic acid-based chemical blowing agents include hydrogen carbonate (bicarbonate) and carbonate salts, in particular those of formula $XHCO_3$ or $X_2CO_3$, wherein X stands for a generic cation, such as $Na^+$, $K^+$, $NH_4^+$, $½Zn^{2+}$, $½Mg^{2+}$, and $½Ca^{2+}$, in particular $Na^+$ and $K^+$. On the other hand, these types of activators may themselves be suitable for use as the at least one chemical blowing agent CBA.

According to one or more embodiments, the first starting composition comprises, in addition to the at least one chemical blowing agent CBA, at least one activator for the at least one chemical blowing agent CBA.

According to one or more embodiments, the at least one chemical blowing agent CBA is selected from the group consisting of bicarbonates of formula $XHCO_3$ and carbonates of formula $X_2CO_3$, wherein X stands for a generic cation, in particular $Na^+$, $K^+$, $NH_4^+$, $½Zn^{2+}$, $½Mg^{2+}$, or $½Ca^{2+}$, preferably from the group consisting of bicarbonates of formula $XHCO_3$, wherein X stands for a generic cation, in particular $Na^+$, $K^+$, $NH_4^+$, $½Zn^{2+}$, $½Mg^{2+}$, or $½Ca^{2+}$, more preferably from the group consisting of sodium and potassium bicarbonates.

The at least one chemical blowing agent CBA is preferably present in the first starting composition in an amount of not more than 10 wt.-%, more preferably not more than 7.5 wt.-%, even more preferably not more than 5 wt.-%, still more preferably not more than 3.5 wt.-%, most preferably not more than 2.0 wt.-%, based on the total weight of the first starting composition.

According to one or more embodiments, the at least one chemical blowing agent CBA comprises at least 0.1 wt.-%, preferably at least 0.15 wt.-%, more preferably at least 0.2 wt.-%, even more preferably at least 0.25 wt.-%, of the total weight of the first starting composition. According to one or more further embodiments, the at least one chemical blowing agent CBA comprises 0.1-3.0 wt.-%, preferably 0.15-2.5 wt.-%, more preferably 0.2-2.0 wt.-%, even more preferably 0.2-1.75 wt.-%, still more preferably 0.2-1.5 wt.-%, most preferably 0.25-1.25 wt.-%, of the total weight of the first starting composition.

Adding the at least one chemical blowing agent CBA to the first starting composition in an amount that falls within the above cited ranges has been found out to enable providing the functional layer with a desired surface roughness. Furthermore, it has been found out that use of the at least one chemical blowing agent CBA in an amount of more than 2.0 wt.-% of the total weight of the first starting composition may in some cases result in formation of pores and holes extending between the outer surfaces of the functional layer. In some cases, the use of an excessive amount of the at least one chemical blowing agent has been found out to result in formation of pores and holes also in the barrier layer, which is then not capable of performing its waterproofing function.

Especially in case the at least one solid filler F comprises hydraulic binders, it may be preferred that the first starting composition contains only minor amounts of water. According to one or more embodiments, the first starting composition comprises less than 10 wt.-%, preferably less than 7.5 wt.-%, more preferably less than 5 wt.-%, even more preferably less than 3.5 wt.-% of water.

The first molten polymer composition is preferably extruded or co-extruded using an extrusion apparatus comprising an extruder and a die.

Such extrusion apparatuses are well known to a person skilled in the art. A suitable extruder comprises a barrel and a screw unit contained in the barrel or a ram. Any conventional extruders, for example, a ram extruder, single screw extruder, or a twin-screw extruder may be used. Preferably, the extruder is a screw extruder, more preferably a twin-screw extruder. The screw unit of a conventional screw extruder is typically considered to comprise feed, transition, and metering sections. In the feed section the thermoplastic composition enters the channels of the rotating screw and is conveyed towards the transition section, in which the composition is compressed and melted. The composition should be fully melted when it leaves the transition section. The function of the metering section is to homogenize the melted composition and to allow it to be metered or pumped out at constant rate. The extrusion apparatus further comprises a die, preferably a flat die, consisting of manifold, approach, and lip regions. In case of a co-extrusion process, the extrusion apparatus preferably comprises at least two extruders, preferably twin-screw extruders, and a single- or a multi-manifold die.

The extruder barrel comprises a feed port through which the material to be extruded is fed to the extruder and an outlet port through which the material leaves the barrel. The outlet port is coupled with the die via a gate or adapter piece. A mixing device may be interposed between the barrel and the die. The feed port is typically connected with a hopper to which the material to be extruded is added. It is preferred that a screen pack and a breaker plate are positioned at the end of the barrel to avoid plugging in the nozzles. The extruder further comprises heating elements, cooling elements, temperature sensors and temperature control elements to provide temperature controlled zones along the barrel, also known as barrel zones. The extruder may comprise, for example, 3 to 8 barrel zones, preferably at least 5 barrel zones, by the use of which a temperature profile can be realized in the barrel.

Preferably, a significant part, preferably the entire amount of the at least one thermoplastic polymer P1 is fed into the extruder through the feed port. It may be preferred that at least part of the at least one solid filler F is fed into the extruder through another port located downstream from the feed port. The term "downstream" designates in the present document the direction to the outlet port. For example, it may be advantageous that not more than 50 wt.-%, preferably not more than 30 wt.-%, more preferably not more than 10 wt.-%, of the total amount of the at least one solid filler F is fed into the extruder through the feed port with the entire amount of the at least one thermoplastic polymer P1 and that the remaining portion of the at least one solid filler F is fed into the extruder through a another port located downstream from the feed port.

It may also be preferable that only a portion of the at least one chemical blowing agent CBA and/or the at least one surfactant SF, if used, are fed into the extruder through the feed port and that at least 10 wt.-%, preferably at least 20 wt.% of the total amount of these components is fed into the extruder through another port located downstream from the feed port.

Some or all of the constituents of the first starting composition can also be mixed to obtain a premix, which is then fed into the extruder through the feed port. The premix can be carried out using any type of conventional blending apparatus, which are known to a person skilled in the art. In a premixing process, the particles of the at least one thermoplastic polymer P1 are mixed at an elevated temperature with the other constituents, such as with the at least one solid filler F and/or with the at least one chemical blowing agent CBA, to obtain a homogeneously mixed mixture. It is also possible to that some or all of the constituents of the first starting composition are processed in a compounding extruder to pellets or granules, which are then fed into the extruder though the feed port.

The preferred extrusion temperature depends on the embodiment of the sealing device, in particular on the type polymer basis of the functional layer. The term "extrusion temperature" refers to the temperature of the extruded composition in the die outlet. According to one or more embodiments, the extrusion temperature is in the range of 80-250° C., preferably 100-240° C., more preferably 120-220° C., even more preferably 140-200° C.

The preferred extrusion pressure depends on the embodiment of the sealing device, in particular on the type polymer basis of the functional layer and on the amount of the at least one solid filler F in the functional layer. The term "extrusion pressure" refers to the pressure of the composition at the end of the metering zone just before the composition enters the die inlet.

According to one or more embodiments, the extrusion pressure is in the range of 20-350 bar, preferably 30-240 bar, more preferably 35-200 bar, even more preferably 40-130 bar.

The extrusion process may be conducted by using different temperature profiles, such as an increasing temperature profile where the temperature increases downstream the barrel, a decreasing temperature profile where the temperature decreases downstream the barrel, and a humped temperature profile where the temperature increases from the feed port toward a certain set point, for example toward the middle of the barrel. It may be preferable that the extrusion process is conducted by using a humped temperature profile.

Preferably, at least part, such as at least 5 wt.-%, in particular at least 10 wt.-%, preferably 25 wt.-%, more preferably at least 50 wt.-%, most preferably at least 75 wt.-%, of the at least one chemical blowing agent CBA decomposes while the first starting composition is conveyed through the barrel and before the melt processed starting composition enters the die. This is ensured by selection of a suitable chemical blowing agent or a suitable mixture of a chemical blowing agent and an activator and by adjusting the temperature profile in the feed, transition and metering sections. Preferably, the first starting composition is maintained at a temperature, which is at least 10° C. above the decomposition temperature of the at least one chemical blowing agent CBA as the first starting composition is conveyed through the extruder barrel.

Furthermore, the extruder is preferably operated with closed venting unit(s). It is essential that at least a significant part of the blowing gases released inside the extruder barrel are kept trapped in the melt-processed polymer composition and not released before the first molten polymer composition exits the extruder die.

According to one or more embodiments, the method for producing a sealing device comprises a further step of extruding or co-extruding a second molten polymer composition comprising the constituents of the barrier layer as defined above through an extruder die.

Preferably, the second molten polymer composition is obtained by melt-processing a second starting composition comprising the constituents of the barrier layer.

The further details of the method for producing a sealing device depend on the embodiment of the sealing device.

According to one or more embodiments, the method for producing a sealing device comprises co-extruding the first molten polymer composition and the second molten polymer composition through a common extruder die, preferably a flat die, using a co-extrusion apparatus. Preferably, the co-extrusion apparatus comprises a first extruder for melt-processing the first starting composition and a second extruder for melt-processing the second starting composition. The first and second molten polymer compositions are extruded through a common extruder die, which can be equipped with a single- or a multi-manifold. The thickness of the extruded functional layer and barrier layer as well as the adhesion between the layers can be easily controlled by adjusting the die lip of the co-extrusion apparatus. It is preferred that the first extruder is operated with closed venting unit(s) in order to prevent premature release of the blowing gas.

It may be preferred that the method for producing a sealing device comprises a further step of employing spaced apart calender cooling rolls through which the composite article comprising the extruded functional layer and the extruded barrier layer is drawn subsequent to the co-extrusion step. The thickness of the functional layer and the barrier layer can be further controlled by adjusting the gap size between the calender cooling rolls. Preferably, the gap between the calender cooling rolls is adjusted such that substantially no pressure is exerted on the surface of the functional layer in order to obtain a functional layer with desired surface roughness.

According to one or more further embodiments, the method for producing a sealing device comprises extruding the first molten polymer composition through a first extruder die using a first extrusion apparatus and extruding the second molten polymer composition through a second extruder die using a second extrusion apparatus and bonding the thus obtained functional layer and barrier layer to each other. The extruded functional layer and barrier layer can be, for example, be thermally laminated to each other or adhered to each other using an adhesive. The term "thermal lamination" refers here to a process comprising partially melting at least one of the layers upon application of thermal energy followed by a cooling step, which results in formation of a bond between the layers without using a bonding agent, such as an adhesive.

According to one or more further embodiments, the method for producing a sealing device comprises extruding the second molten polymer composition through an extruder die on a second major surface of a pre-formed functional layer or extruding the first molten polymer composition through an extruder die on a first major surface of a pre-formed barrier layer. In these embodiments, the barrier layer is simultaneously formed and bonded to the previously formed functional layer or vice versa.

Another subject of the present invention is a sealing device obtained by using the method for producing a sealing device according to the present invention.

The sealing device can be a waterproofing membrane, a roofing membrane, a tunneling membrane, or a sealing tape.

Still another subject of the present invention is a use of the sealing device according to the present invention for waterproofing of a substrate. The substrate to be waterproofed can be any structural or civil engineering structure, which is to be sealed against moisture and water.

According to one or more embodiments, the use of the sealing device for waterproofing of a substrate comprises steps of:
  i) Applying a sealing device according to the present invention to a surface of the substrate such that the second major surface of the barrier layer is facing the surface of the substrate,
  ii) Casting a fresh concrete composition on the first major surface of the functional layer, and
  iii) Letting the fresh concrete composition to harden.

The term "fresh concrete composition" refers to a concrete composition before hardening, in particular before setting of the concrete composition. The casted concrete composition after hardening can be part of a structure, in particular, an above-ground or underground structure, for example a building, garage, tunnel, landfill, water retention, pond, dike or an element for use in pre-fabricated constructions.

According to one or more further embodiments, the use of the sealing device for waterproofing of substrate comprises steps of:
  i) Providing a sealing device according to the present invention,
  ii) Applying a layer of an adhesive on at least a portion of the surface of the substrate,
  iii) Contacting the layer of adhesive with first major surface of the functional layer.

The adhesive can be a fresh cementitious composition, or a synthetic resin-based adhesive composition, for example, a reactive epoxy-based, polyurethane-based, or acrylic-based adhesive composition or a non-reactive thermoplastic-based or rubber-based adhesive composition.

The term "cementitious composition" refers to concrete, shotcrete, grout, mortar, paste or a combination thereof. The terms "paste", "mortar", "concrete", "shotcrete", and "grout" are well-known terms in the State-of-the-Art. Pastes are mixtures comprising a hydraulic cement binder, usually Portland cement, masonry cement, or mortar cement. Mortars are pastes additionally including fine aggregate, for example sand. Concrete are mortars additionally including coarse aggregate, for example crushed gravel or stone. Shotcrete is concrete (or sometimes mortar) conveyed through a hose and pneumatically projected at high velocity onto a surface. The cementitious compositions can be formed by mixing required amounts of certain components, for example, a hydratable cement, water, and fine and/or coarse aggregate, to produce the particular cementitious composition.

According to one or more further embodiments, the use of the sealing device for waterproofing of substrate comprises steps of:
i) Providing a sealing device according to the present invention,
ii) Applying a layer of an adhesive composition on at least a portion of the surface of the substrate to form a first adhesive film and on the first major surface of the functional layer to form a second adhesive film,
iii) Contacting the first and second adhesive films to affect adhesive bonding between the substrate and the sealing device.

The adhesive composition used in this these embodiments is preferably a solvent or water based contact adhesive. Suitable solvent-based contact adhesives are commercially available, for example, under the trade name of Sarnacol® (from Sika AG).

EXAMPLES

The followings compounds shown in Table 1 were used in the examples:

TABLE 1

| | |
|---|---|
| Polymer 1 | Butene copolymer linear low density polyethylene, MFR (190° C./2.16 kg) 1-3.5 g/10 min, softening point 85-105° C. (ISO 306/A) |
| Polymer 2 | Ethylene vinyl acetate copolymer, content of vinyl acetate 16-25 wt.-%, MFR (190° C./2.16 kg) 1.5-5 g/10 min (ISO 1133) |
| Filler 1 | Calcium carbonate, 98 wt.-%, coated, d50 particle size 2.5 µm |
| Filler 2 | Portland composite cement CEM II/B-M (T-LL) (SN EN 197-1) |
| Blowing agent | Sodium hydrogen carbonate, decomposition temperature 124° C. |

Preparation of Sealing Devices

The exemplary sealing devices Ex-1 to Ex-4 and the reference sealing devices Ref-1 and Ref-2 were produced using a laboratory scale co-extrusion apparatus comprising two twin screw extruders (Berstorff GmbH), a flat die and set of water-cooled calender rolls. A thermoplastic waterproofing membrane based on polymer blend of ethylene vinyl acetate copolymer and linear low-density polyethylene (LLDPE) was used as the barrier layer in all sealing devices.

A first starting composition containing the constituents of the functional layer was melt-processed in a first twin screw extruder. In case the first starting composition contained a chemical blowing agent, the extruder was operated with closed venting unit in order to prevent the escape of blowing gases. A second starting composition containing the constituents of the barrier layer was simultaneously melt-processed in a second twin screw extruder and the obtained first and second molten polymer compositions were co-extruded through a flat die on top of each other to produce a two-layer membrane composite, which was subsequently cooled between the calender rolls. The gap between the calender cooling rolls was adjusted to be somewhat larger than the thickness of the co-extruded membrane. The mass per unit area of the functional layers varied from 582 to 651 g/m² and the thickness of the barrier layer was approximately 0.7 mm.

The compositions of the functional layers and operating conditions of the co-extrusion apparatus during production of the sealing devices are presented in Table 2. The extrusion temperature and pressure were measured at a point, where the melt-processed mass entered the inlet of the flat die. The temperature of the cooling rolls was approximately 20° C. during the production process.

Thickness of Barrier Layer

The thickness of the barrier layer was determined by using a measurement method as defined in DIN EN 1849-2 standard. An optical microscope of type Keyence VHX-600 with 30-fold magnification was used for measuring the thickness of the cross sections.

Mass Per Unit Area of Functional Layers

In order to the determine of the mass per unit area of the functional layer of a sealing device, a reference membrane composed of a barrier layer having the same thickness and composition as the barrier layer of the corresponding exemplary sealing device was first produced. 57 circular samples having a diameter of 8 cm were then cut from the sealing device and the corresponding reference membrane. The mass of each sample was measured with accuracy of 0.01 g and the mass per unit areas were calculated by dividing the measured mass by the calculated area of the sample. The coating weight the functional layer of the samples cut from the sealing device were then determined by subtracting the mass per unit area of the sample of the reference membrane from the mass per unit area of the sample of the sealing device. The circular samples were cut from the sealing device and the reference membrane in the longitudinal direction along a length of ca. 5.5 m, wherein the distance between adjacent samples was ca. 30 cm.

Waviness Parameters and Waviness Factor

For characterizing the surface roughness of the functional layers, a sample strip having dimension of 100 mm (length)× 100 mm (width) was cut from each of the produced sealing device and adhered to a hard PVC sheet having a dimension of 100 mm (length)×100 mm (width)×5 mm (thickness), with the functional layer facing upwards, to ensure a completely planar lying of the sample. A double-sided adhesive tape was used in attaching the sample to the hard PVC sheet.

The surface geometry of the functional layer of each sample strip was measured with a 3D-scanner smartSCAN from the company AICON 3D Systems GmbH. In the following paragraph the notations in parenthesis refer to the terminology used in ISO 25178 standard.

A polynom of second degree fitted to the measured data points (F operator) was first subtracted from the surface geometry (extracted surface) to obtain a primary profile (SF surface). The waviness profile was then obtained from the primary profile using a cutoff length $\lambda_c$ (S filter) having a value of 0.8 mm. The waviness parameters $W_{Sq}$ and $W_{Spd}$ (areal parameters) according to ISO 25178 standard were calculated from the determined waviness profile and the waviness factor $W_f$ was calculated as a product of the $W_{Sq}$ and $W_{Spd}$. The calculations required for obtaining the primary profile, waviness profile, and the waviness parameters $W_{Sq}$ and $W_{Spd}$ from the measured surface geometry were performed with a MountainsMap® Premium (V7) software (from DigitalSurf).

Preparation of the Concrete Test Specimen

Three sample strips with a dimension of 200 mm (length)×50 mm (width) were cut from each of the sealing devices produced as described above. The sample strips were placed into formworks having a dimension of 200 mm (length)×50 mm (width)×30 mm (height) with the functional layer facing upwards and with the barrier layer, if present, against the bottom of the formwork.

One edge of each sample strip on the side of the functional layer was covered with an adhesive tape having a length of 50 mm and width coinciding with the width of the strip to prevent the adhesion to the hardened concrete. The adhesive tapes were used to provide easier installation of the test specimens to the peel resistance testing apparatus.

For the preparation of concrete specimens, a batch of fresh concrete formulation was prepared. The fresh concrete formulation was obtained by mixing 8.9900 kg of a concrete dry batch of type MC 0.45 conforming to EN 1766 standard, the sample strip [N/50 mm] during peeling over a length of approximately 70 mm thus excluding the first and last quarter of the total peeling length from the calculation.

The average peel resistance values presented in Table 2 have been calculated as an average of three measurements conducted with the same sealing device.

| Composition [wt-] | Ref-1 | Ref-2 | Ex-1 | Ex-2 | Ex-3 | Ex-4 |
|---|---|---|---|---|---|---|
| Polymer 1 | 20.00 | 25.00 | 19.88 | 19.75 | 19.63 | 21.48 |
| Polymer 2 | 20.00 | 25.00 | 19.88 | 19.75 | 19.63 | 21.48 |
| Filler 1 | 60.00 | — | 60.00 | 60.00 | 60.00 | 56.00 |
| Filler 2 | — | 50.00 | — | — | — | — |
| Blowing Agent | 0.00 | 0.00 | 0.25 | 0.50 | 0.75 | 1.05 |
| Total | 100.00 | 100.00 | 100.00 | 100.00 | 100.00 | 100.00 |
| Co-extruder conditions | | | | | | |
| $1^{st}$ extruder pressure [bar] | 126 | 55 | 114 | 118 | 113 | 100 |
| $1^{st}$ extruder temperature [° C.] | 162 | 172 | 161 | 161 | 163 | 163 |
| $1^{st}$ extruder flux [kg/h] | 9 | 17 | 9 | 9 | 9 | 9 |
| $2^{nd}$ extruder pressure [bar] | 80 | 36 | 80 | 80 | 80 | 90 |
| $2^{nd}$ extruder temperature [° C.] | 179 | 168 | 179 | 179 | 179 | 178 |
| 2nd extruder flux [kg/h] | 15 | 10 | 15 | 15 | 15 | 15 |
| Measured properties, functional layer | | | | | | |
| Mass per unit area [g/m$^2$] | 598 | — | 623 | 582 | 651 | 646 |
| $W_{Sq}$ | 0.025 | 0.051 | 0.138 | 0.193 | 0.216 | 0.28 |
| $W_{Spd}$ [1/mm] | 0.012 | 0.203 | 0.105 | 0.0866 | 0.0885 | 0.075 |
| $W_{factor} = W_{Sq} * W_{Spd}$ [1/mm] | 0.00030 | 0.009030 | 0.01449 | 0.01671 | 0.0191 | 0.02100 |
| Peel strength after 24 hours [N/50 mm] | 0 | 4 | 16 | 19 | 31 | 41.5 |

0.7440 kg of water and 0.0110 kg of Viscocrete 3082 for five minutes in a tumbling mixer. The concrete dry batch of type MC 0.45 contained 1.6811 kg of CEM I 42.5 N cement (Normo 4, Holcim), 7.3089 kg of aggregates containing 3% Nekafill-15 (from KFN) concrete additive (limestone filler), 24% sand having a particle size of 0-1 mm, 36% sand having a particle size of 1-4 mm, and 37% gravel having a particle size of 4-8 mm. Before blending with water and Viscocrete 3082 the concrete dry batch was homogenized for five minutes in a tumbling mixer.

The formworks containing the sample strips were subsequently filled with the fresh concrete formulation and vibrated for two minutes to release the entrapped air. After hardening for 24 hours under standard atmosphere (air temperature 23° C., relative air humidity 50%), the test concrete specimens were stripped from the formworks and measured for concrete peel resistances (early adhesion strength).

Concrete Peel Resistances

The measurement of peel resistances was conducted in accordance with the procedure laid out in the standard DIN EN 1372:2015-06. A Zwick Roell AllroundLine Z010 material testing apparatus equipped with a Zwick Roell 90°-peeling device (type number 316237) was used for conducting the peel resistance measurements.

In the peel resistance measurements, a concrete specimen was clamped with the upper grip of the material testing apparatus for a length of 10 mm at the end of the concrete specimen comprising the taped section of the sample strip. Following, the strip was peeled off from the surface of the concrete specimen at a peeling angle of 90° and at a constant cross beam speed of 100 mm/min. During the measurements the distance of the rolls was approximately 570 mm. The peeling of the sample strip was continued until a length of approximately 140 mm of the strip was peeled off from the surface of the concrete specimen. The values for peel resistance were calculated as average peel force per width of

The invention claimed is:

1. A sealing device comprising a functional layer having a first major surface and a second major surface and a barrier layer directly or indirectly connected to the second major surface of the functional layer, the functional layer comprising:
   a) 20-75 wt.-%, of at least one thermoplastic polymer, and
   b) 25-80 wt.-%, of at least one solid filler,
   all proportions being based on the total weight of the functional layer, wherein
   the first major surface of the functional layer has a surface roughness having a waviness factor, determined as the product of the root mean square roughness of waviness and peak density of waviness, of at least 0.0125 1/mm, wherein the waviness factor and the peak density waviness are determined according to ISO 25178 standard from a waviness profile obtained from a measured primary profile using a cutoff length of 0.8 mm.

2. The sealing device according to claim 1, wherein particles of the at least one solid filler are distributed throughout the entire volume of the functional layer.

3. The sealing device according to claim 1, wherein the at least one solid filler is selected from the group consisting of inert mineral fillers, mineral binders, and synthetic organic fillers.

4. The sealing device according to claim 1, wherein the at least one solid filler comprises at least one inert mineral filler selected from the group consisting of sand, granite, calcium carbonate, clay, expanded clay, diatomaceous earth, pumice, mica, kaolin, talc, dolomite, xonotlite, perlite, vermiculite, Wollastonite, barite, magnesium carbonate, silica, fumed silica, fused silica, aerogels, glass beads, hollow glass spheres, ceramic spheres, bauxite, comminuted concrete, and zeolites.

5. The sealing device according claim 1, wherein the functional layer further comprises at least one surfactant.

6. The sealing device according to claim 1, wherein the functional layer has a mass per unit weight in the range of 100-1500 g/m$^2$.

7. The sealing device according to claim 1, wherein the barrier layer has a first and a second major surface, and at least a portion of the first major surface of the barrier layer is directly connected to the second major surface of the functional layer.

8. The sealing device according to claim 1, wherein the barrier layer comprises at least 50 wt.-% of at least one thermoplastic polymer.

9. A method for producing the sealing device according to claim 1, the method comprising extruding or co-extruding a first molten polymer composition comprising the at least one thermoplastic polymer and the at least one solid filler through an extruder die, wherein the first molten polymer composition further contains a blowing gas, which is released from the first molten polymer composition through a surface of the functional layer discharged from the extruder die, and the first molten polymer composition is obtained by melt-processing a first starting composition comprising the at least one thermoplastic polymer and the at least one solid filler.

10. The method according to claim 9, wherein the first starting composition further comprises at least at least chemical blowing agent.

11. The method according to claim 10, wherein the at least one chemical blowing agent is selected from the group consisting of azodicarbonamide, azobisisobutyronitrile, azocyclohexyl nitrile, dinitrosopentamethylene tetramine, azodiamino benzene, calcium azide, 4,4'-diphenyldisulphonyl azide, benzenesulphonyl hydrazide, 4,4-oxybenzenesulphonyl semicarbazide, 4,4-oxybis(benzenesulphonyl hydrazide), diphenyl sulphone-3,3-disulphonyl hydrazide, p-toluenesulphonyl hydrazide, p-toluenesulphonyl semicarbazide, trihydrazino triazine, N,N'-dimethyl-N,N'-dinitrosoterephthalamide, diazoaminobenzene, diazoaminotoluene, hydrazodicarbonamide, barium azodicarboxylate, 5-hydroxytetrazole, sodium bicarbonate, ammonium carbonate, ammonium bicarbonate, potassium bicarbonate, and organic acids.

12. The method according to claim 10, wherein the at least one chemical blowing agent comprises 0.1-3.0 wt.-%, of the total weight of the first starting composition.

13. The method according to claim 9 comprising a further step of extruding or co-extruding a second molten polymer composition to form the barrier layer.

14. The method according to claim 13, wherein the second molten polymer composition is obtained by melt-processing a second starting composition.

15. A sealing device obtained by the method according to claim 9.

16. A method of using the sealing device according to claim 1, comprising applying the sealing device to a substrate for waterproofing the substrate.

* * * * *